United States Patent
Tsai

(10) Patent No.: US 9,282,813 B2
(45) Date of Patent: Mar. 15, 2016

(54) RUNNER ARRANGEMENT OF INJECTION MOLD FOLDABLE TABLE

(71) Applicant: Ping-Cheng Tsai, Shenzhen (CN)

(72) Inventor: Ping-Cheng Tsai, Shenzhen (CN)

( * ) Notice: Subject to any disclaimer, the term of this patent is extended or adjusted under 35 U.S.C. 154(b) by 0 days.

(21) Appl. No.: 14/102,516

(22) Filed: Dec. 11, 2013

(65) Prior Publication Data

US 2015/0157123 A1  Jun. 11, 2015

(51) Int. Cl.
*A47B 3/00* (2006.01)
*A47B 13/00* (2006.01)
*A47B 3/087* (2006.01)

(52) U.S. Cl.
CPC .............. *A47B 13/003* (2013.01); *A47B 3/087* (2013.01); *A47B 2013/006* (2013.01)

(58) Field of Classification Search
CPC ...... A47B 13/02; A47B 13/08; A47B 13/003; A47B 13/87; A47B 2013/006; F16B 39/30; F16B 39/284; F16B 39/225; F16B 39/34
USPC .......... 108/129–132, 91, 125, 126, 901, 166, 108/167, 169, 171, 174; 411/301
See application file for complete search history.

(56) References Cited

U.S. PATENT DOCUMENTS

| 3,356,401 | A * | 12/1967 | Bertram | 52/506.05 |
| 5,709,513 | A * | 1/1998 | Tsai | F16B 29/00 |
| | | | | 403/260 |
| 6,752,091 | B2 * | 6/2004 | Glover et al. | 108/168 |
| 7,472,655 | B2 * | 1/2009 | Leng | 108/27 |
| 2003/0164123 | A1 * | 9/2003 | Lou-Hao | 108/132 |
| 2004/0244656 | A1 * | 12/2004 | Shenghao et al. | 108/132 |
| 2007/0199483 | A1 * | 8/2007 | Peery et al. | 108/132 |
| 2010/0170423 | A1 * | 7/2010 | Chang | 108/167 |

FOREIGN PATENT DOCUMENTS

DE  29521508  * 6/1997

* cited by examiner

*Primary Examiner* — Janet M Wilkens
(74) *Attorney, Agent, or Firm* — Raymond Y. Chan; David and Raymond Patent Firm

(57) ABSTRACT

A foldable table includes two runners and an injection mold table frame including a tabletop and a runner arrangement integrated with the tabletop. The tabletop includes a surrounding rim downwardly extended from a peripheral of the tabletop, wherein the runners are extended along two longitudinal sides of the tabletop to align with the surrounding rim. The runner arrangement includes a plurality of injection attachments integrally and spacedly extended from an inner side of the surrounding rim. A plurality of fasteners fasten at the injection attachments respectively through each of the runners to securely lock up the runners at the longitudinal sides of the tabletop respectively.

10 Claims, 5 Drawing Sheets

RUNNER ARRANGEMENT OF INJECTION MOLD FOLDABLE TABLE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a foldable table, and more particularly to a runner arrangement of an injection mold foldable table, wherein the runner arrangement comprises an injection attachment integrated with the injection mold tabletop to enhance the strength of the injection mold tabletop.

2. Description of Related Arts

Foldable tables, such as banquet tables, have become very popular since the tables are economy, cheap and foldable that can be quickly and easily folded for carriage and storage and unfolded for use. Especially when some participant-intensive activities take place in multi-function rooms or designated areas, the foldable tables can be temporary set up in minutes. After the functions, the foldable tables can be quickly and neatly folded up for storage.

The conventional foldable table generally comprises a tabletop A1 and a leg frame pivotally coupled at the bottom side of the tabletop A1. In order to enhance the portability of the foldable table, the tabletop A1 is made of lightweight material such as plastic. One of the common technologies to manufacture the tabletop A1 is known as the injection molding technique. Therefore, the overall weight of the foldable table will be substantially reduced by the plastic tabletop A1. However, the strength of the plastic tabletop A1 is weak and the plastic tabletop A1 is incapable of coupling with the metal leg frame. Therefore, the conventional foldable table further comprises two runners A2 extended along two longitudinal sides of the plastic tabletop A1 to enhance the strength thereof and to couple with the leg frame. The runners A2 are the essential components of the foldable table to evenly distribute the loading force on the plastic tabletop A1 to the leg frame and to ensure the attachment between the leg frame and the plastic tabletop A1.

Accordingly, in order to hold the runners A2 extended along two longitudinal sides of the plastic tabletop A1, the plastic tabletop A1 is constructed to have an outer rim A3 and an inner rim A4 to form a double-wall structure at the longitudinal sides of the plastic tabletop A1, as shown in FIGS. 1A and 1B. The runners A2 can be held the inner rim A4 only by means of screws. In particular, the runner A2 is extended along the inner side of the inner rim A4 as shown in FIG. 1A, such that the screw is arranged to hold the runner A2 at the inner rim A4. It is worth mentioning that the outer rim A3 forms a covering rim to keep the aesthetic appearance of the foldable table and has no attaching function to the runner A2. In other words, the screw cannot attach to the outer rim A3 because the sharp end of the screw will protrude out of the outer rim A3 which is dangerous and will affect the aesthetic appearance of the foldable table. Even though the runner A2 can be received between the inner and outer rims A4, A3, as shown in FIG. 1B, the screw can only attach to the runner A2 through the inner rim A4 only. The outer rim A3 is designed to hide to the runner A2 and to keep the aesthetic appearance of the foldable table. In other words, the runner A2 cannot be secured or attached to the inner rim A4 but can only be held along the inner rim A4 by the screws.

Furthermore, it is a waste of the material to form the double-wall structure for the plastic tabletop A1 because only few portions of the inner rim A4 are used for the screws to hold the runner A2 in position. The injection process of the plastic tabletop A1 is complicated to ensure the alignment between the runner A2 and the inner rim A4. Most importantly, the holding point between the runner A2 and the inner rim A4 via the screw is relatively weak because it is limited by the thickness of the inner rim A4, wherein the holding point can only withstand 4 to 5 N (Newton force). Since the inner rim A4 at the holding point is cracked or broken, the runner A2 will not capable of reinforcing the strength of the plastic tabletop A1, such that the runner A2 will lose its original reinforcing ability to the plastic tabletop A1.

Furthermore, the double-wall structure only forms at two longitudinal sides of the plastic tabletop A1 since the runners A2 are only extended along the longitudinal sides of the plastic tabletop A1. In other words, the transverse sides of the plastic tabletop A1 only have a single-wall structure that only the outer rim is formed at each of the transverse sides of the plastic tabletop A1. Therefore, the strength of the plastic tabletop A1 is weaken at the transverse sides of the plastic tabletop A1, especially at the corner portions of the plastic tabletop A1.

SUMMARY OF THE PRESENT INVENTION

The invention is advantageous in that it provides a runner arrangement of an injection mold foldable table, wherein the runner arrangement comprises an injection attachment integrated with the injection mold tabletop to enhance the strength of the injection mold tabletop.

Another advantage of the invention is to provide a runner arrangement of an injection mold foldable table, wherein the injection attachment is integrally extended from an outer rim to form a fastener mold to secure the fastener thereat so as to securely lock up the runner in position. The injection attachment can withstand 24 to 29 N (Newton force) to ensure the reinforcement of the tabletop.

Another advantage of the invention is to provide a runner arrangement of an injection mold foldable table, wherein the injection attachment is integrally formed with the tabletop to enhance the rigidity of the tabletop.

Another advantage of the invention is to provide a runner arrangement of an injection mold foldable table, wherein the injection attachment can securely attach the runner along the longitudinal side of the tabletop.

Another advantage of the invention is to provide a runner arrangement of an injection mold foldable table, wherein the corner reinforcing ribs are integrally formed at corner portions of the tabletop to enhance the strength of the tabletop.

Another advantage of the invention is to provide a runner arrangement of an injection mold foldable table, which can simplify the manufacturing process of the injection mold tabletop so as to substantially reduce the manufacturing cost of the foldable table.

Another advantage of the invention is to provide a runner arrangement of an injection mold foldable table, which does not require to alter the original structural design of the runner, so as to minimize the manufacturing cost of the runner incorporating with the tabletop.

Another advantage of the invention is to provide a runner arrangement of an injection mold foldable table, wherein no expensive or complicated structure is required to employ in the present invention in order to achieve the above mentioned objects. Therefore, the present invention successfully provides an economic and efficient solution for providing a rigid configuration for the foldable table to support the tabletop by the runner.

Additional advantages and features of the invention will become apparent from the description which follows, and may be realized by means of the instrumentalities and combinations particular point out in the appended claims.

According to the present invention, the foregoing and other objects and advantages are attained by a foldable table which comprises a supporting frame, an injection mold table frame, and a plurality of fasteners. The supporting frame comprises two runners and two leg frames.

The injection mold table frame comprises a tabletop and a runner arrangement integrated with the tabletop. The tabletop comprises a surrounding rim downwardly extended from a peripheral of the tabletop, wherein the two runners are extended along two longitudinal sides of the tabletop to align with the surrounding rim, wherein the two leg frames foldably coupled at a bottom side of the tabletop. The runner arrangement comprises a plurality of injection attachments integrally and spacedly extended from an inner side of the surrounding rim. The fasteners fasten at the injection attachments respectively through each of the runners to securely lock up the runners at the longitudinal sides of the tabletop respectively.

In accordance with another aspect of the invention, the present invention comprises an injection mold table frame for a furniture which comprises two runners, wherein the injection mold table frame comprises a panel and a runner arrangement.

The panel, which is an injection mold panel, comprises a surrounding rim downwardly extended from a peripheral of the panel for aligning said two runners along two longitudinal sides of the panel respectively.

The runner arrangement, which is integrated with the panel, comprises a plurality of injection attachments integrally and spacedly extended from an inner side of the surrounding rim. Therefore, a plurality of fasteners are fastened at the injection attachments respectively through each of the runners to securely lock up the runners at the longitudinal sides of the panel respectively.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1A:
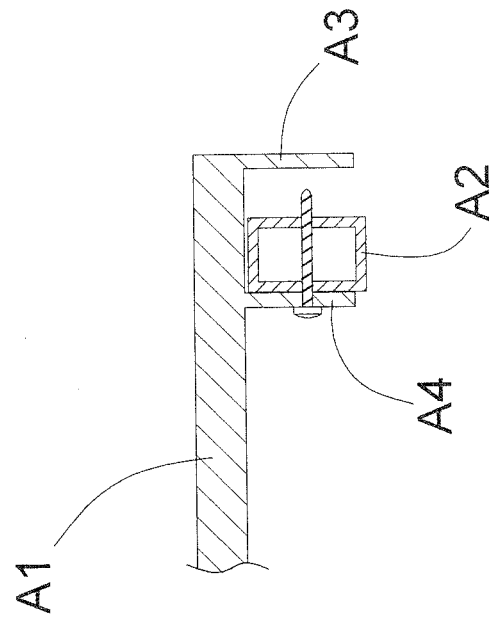
FIG. 1A illustrates a conventional tabletop structure for a runner.
Figure 1B:
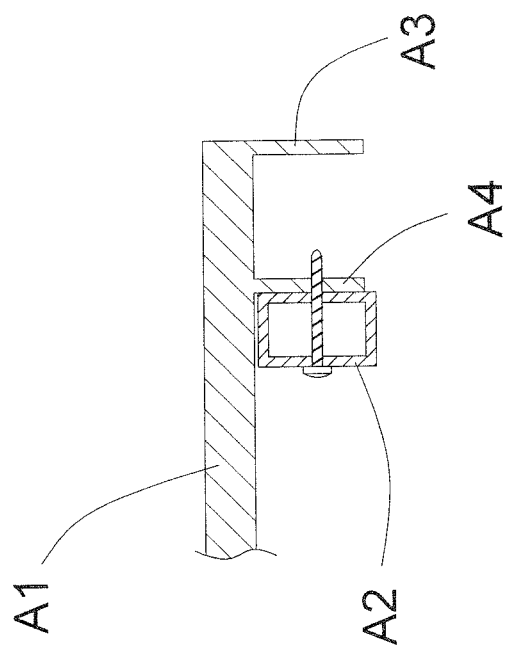
FIG. 1B illustrates another conventional tabletop structure for a runner.
Figure 2:
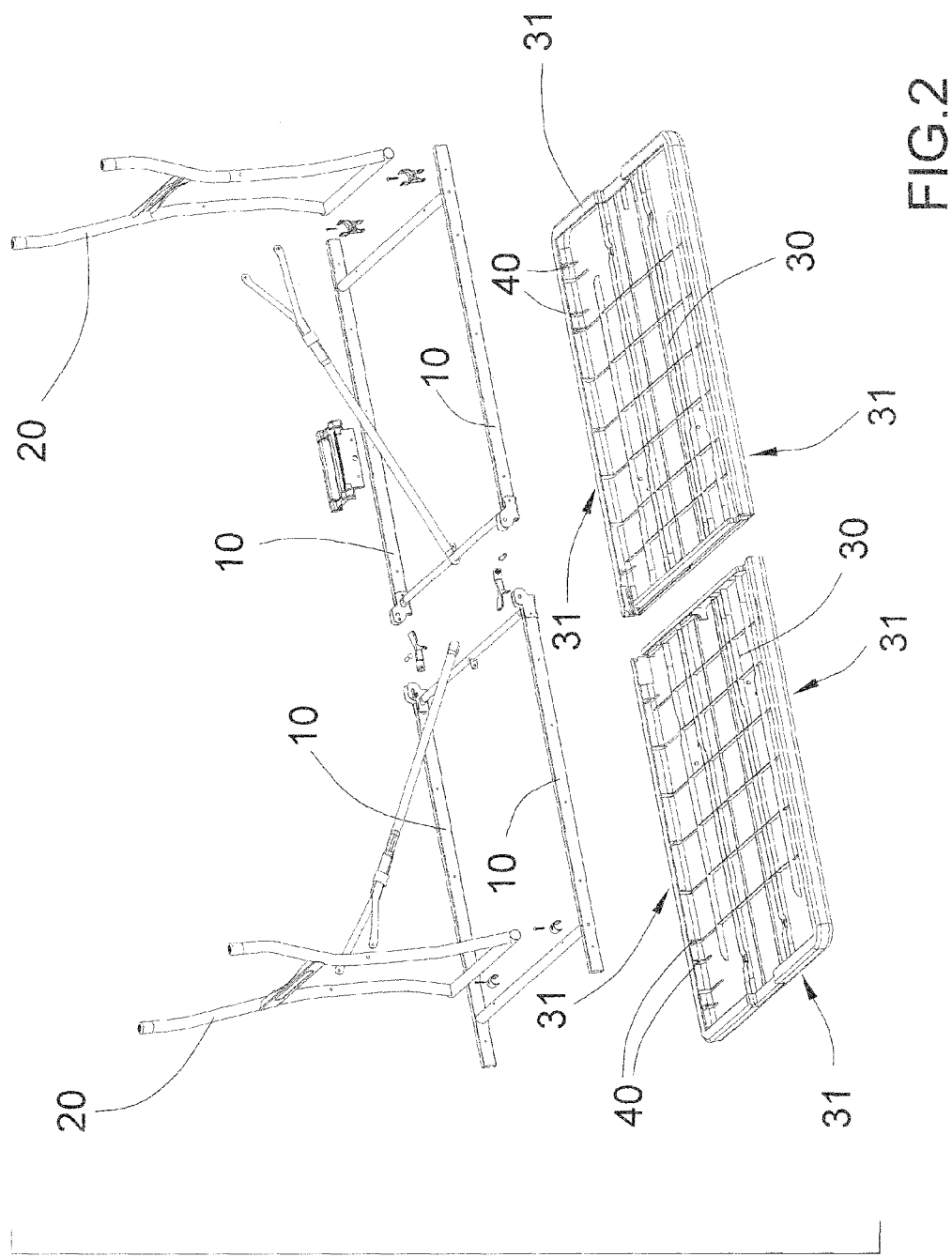
FIG. 2 is an exploded perspective view of an injection mold foldable table according to a preferred embodiment of the present invention.

Referring to FIG. 2 of the drawings, an injection mold foldable table is illustrated according to a preferred embodiment of the present invention. The injection mold foldable table comprises a supporting frame, an injection mold table frame, and a fastening means.

The supporting frame comprises two runners 10 and two leg frames 20. The injection mold table frame comprises an injection mold tabletop 30 and a runner arrangement 40.

According to the preferred embodiment, the tabletop 30 comprises a surrounding rim 31 downwardly extended from a peripheral of the tabletop 30, wherein the two runners 10 are extended along two longitudinal sides of the tabletop 30 to align with the surrounding rim 31. In particular, the two runners 10 are spacedly overlapped with an inner side of the surrounding rim 31 to reinforce the strength of the tabletop 30 at the longitudinal sides thereof.

The tabletop 30 further comprises a bottom rim 32 integrally and inwardly extended from a bottom edge of the surrounding rim 31 to define an elongated runner cavity 33 for receiving the runner 10 therealong. Therefore, the surrounding rim 31 and the bottom rim 32 form a L-shaped cross section to encircle around the peripheral of the tabletop 30 at the bottom side thereof.

The two leg frames 20 are foldably coupled at a bottom side of the tabletop 30, wherein each of the leg frames 20 are pivotally coupled between the runners 10 to move between an unfolded position that the leg frame 20 is outwardly folded from the bottom side of the tabletop 30 to perpendicularly extend therefrom, and a folded position that the leg frame 20 is inwardly folded to overlap and rest on the bottom side of the tabletop 30.

As shown in FIG. 2, the injection mold foldable table can be folded in half to further reduce the overall size of the foldable table when it is folded. The tabletop 30 comprises first and second tabletop panels and two folding joints coupled between the first and second tabletop panels, wherein the leg frames 20 are foldably coupled with the first and second tabletop panels respectively. Therefore, when the leg frames 20 are folded at the bottom sides of the first and second tabletop panels respectively, the first and second tabletop panels can be pivotally folded to overlap with each other in order to fold up the injection mold foldable table. It is worth mentioning that the two runners 10 are configured to have two folding portions being pivotally connected by the respective folding joint.

Figure 3:
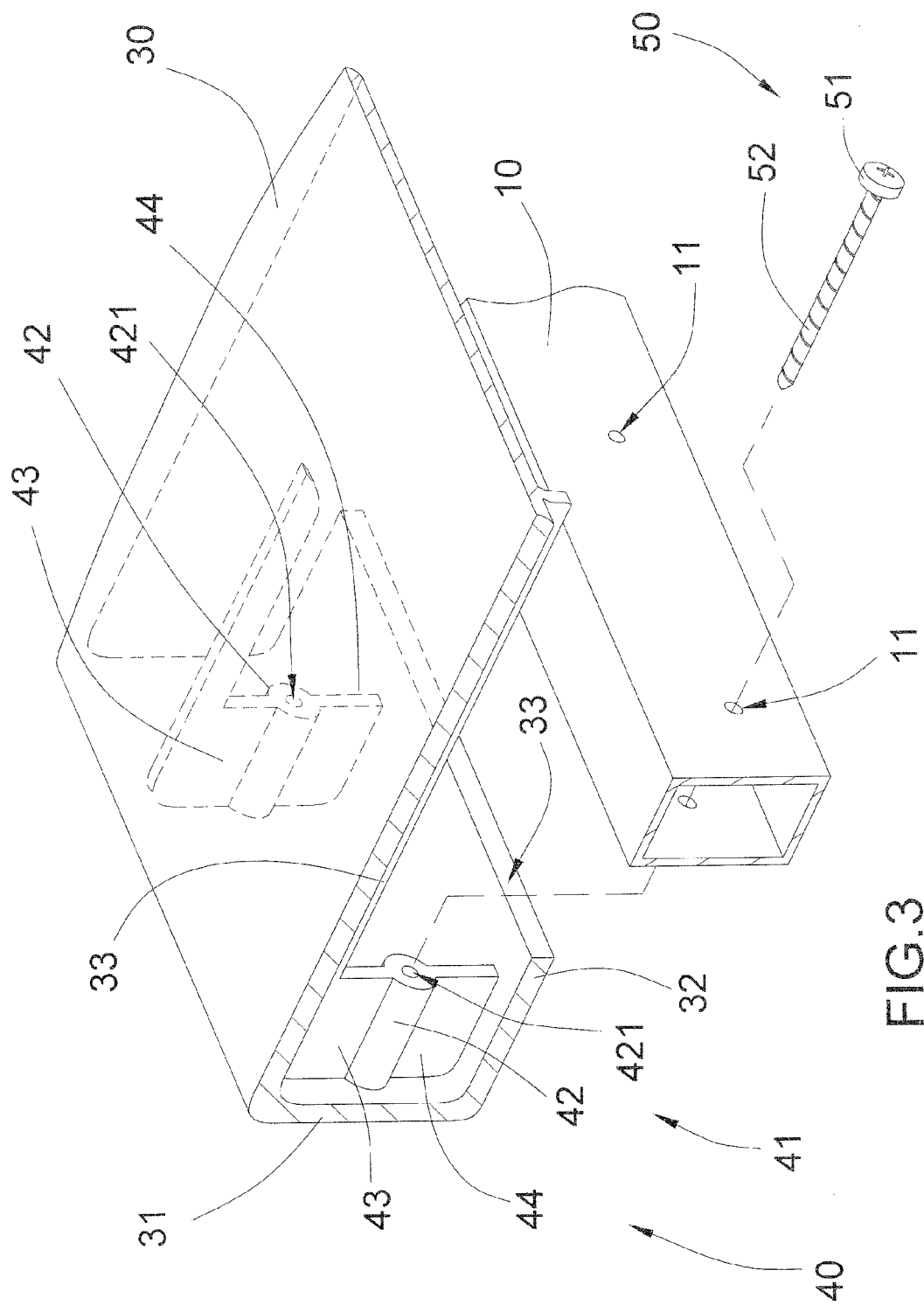
FIG. 3 is a perspective view of the runner arrangement of the injection mold foldable table according to a preferred embodiment of the present invention.
Figure 4:
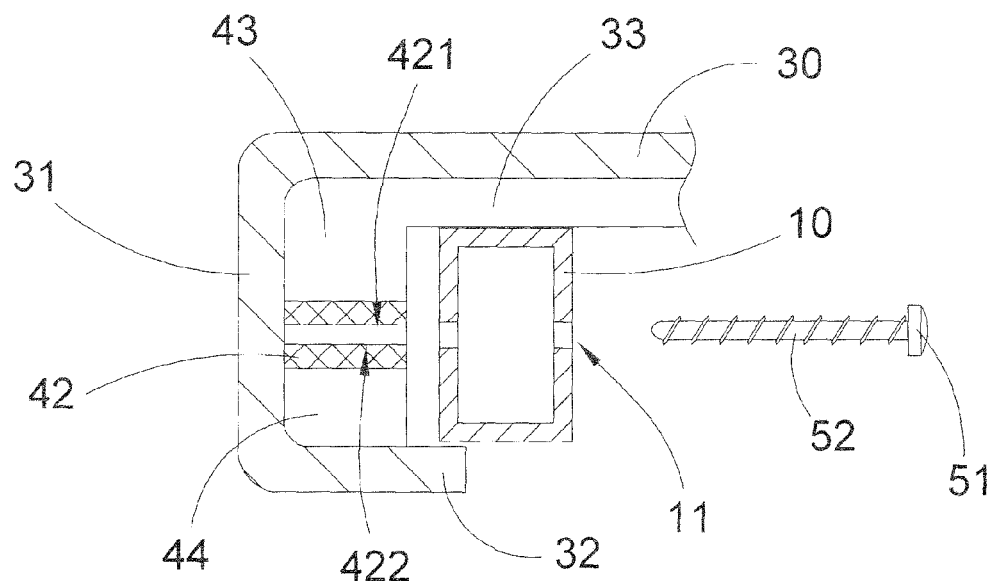
FIG. 4 is a sectional view of the runner arrangement of the injection mold foldable table according to a preferred embodiment of the present invention, illustrating the relationship between the fastener and the fastening slot before the fastener fastens at the fastening slot.
Figure 5:
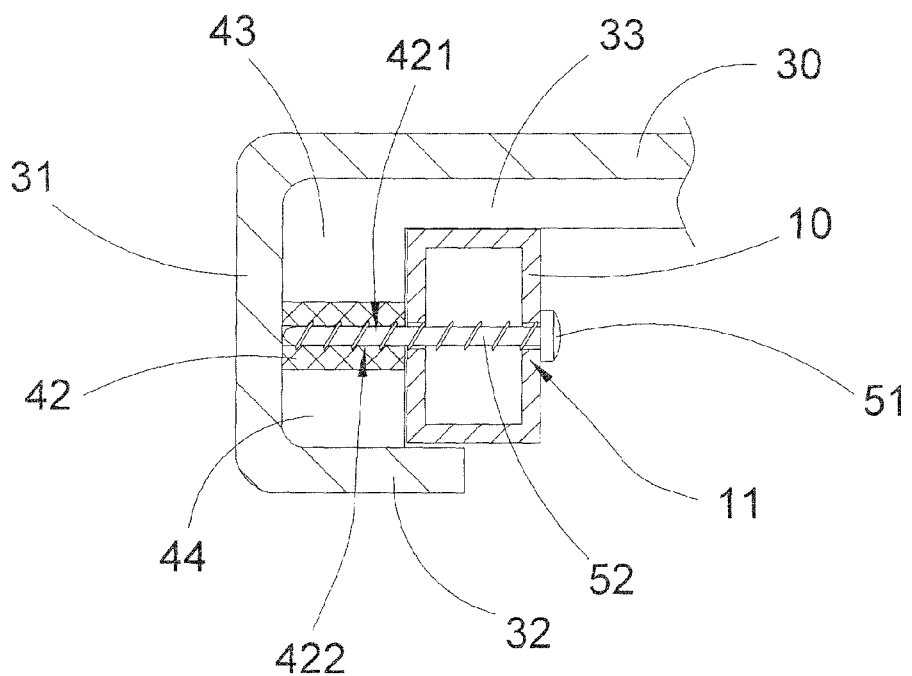
FIG. 5 is a sectional view of the runner arrangement of the injection mold foldable table according to a preferred embodiment of the present invention, illustrating the relationship between the fastener and the fastening slot after the fastener fastens at the fastening slot.

As shown in FIGS. 3 to 5, the runner arrangement 40 is integrated with the tabletop 30, wherein the runner arrangement 40 is formed during the mold injection process of the tabletop 30. In other words, the runner arrangement 40 is formed at the same time when the tabletop 30 is manufactured through the mold injection process. Therefore, the runner arrangement 40 is made of the same material of the tabletop 30.

According to the preferred embodiment, the runner arrangement 40 comprises a plurality of injection attachments 41 integrally and spacedly extended from the inner side of the surrounding rim 31. The injection attachments 41 are formed by mold injection during the manufacturing process of the tabletop 30.

The fastening means comprises a plurality of fasteners 50 at the injection attachments 41 respectively through each of the runners 10 to securely lock up the runners 10 at the longitudinal sides of the tabletop 30 respectively. The fastener 50, which is preferably a screw, has an elongated fastener head 51 and an elongated fastener body 52, wherein the fastening body 52 of the fastener 50 is penetrated through the runner 10 to engage with the injection attachment 41 until the fastener head 51 is pressed against the runner 10.

Accordingly, each of the runners 10 has a plurality of spaced apart through holes 11, wherein when the runner 10 is placed along the surrounding rim 31 at the runner cavity 33, the through holes 11 of the runner 10 is aligned with the injection attachments 41. Therefore, each of the fasteners 50 is extended through the respective through hole 11 to engage with the respective injection attachment 41 so as to lock up the runner 10 at the longitudinal side of the tabletop 30.

Each of the injection attachments 41 comprises a fastener mold 42 integrally and transversely extended from the inner side of the surrounding rim 31, wherein the fastener mold 42 is transversely supported at the runner cavity 33 at a position between the bottom rim 32 and the bottom side of the tabletop 10, such that when the runner 10 is placed at the runner cavity 33, a free end of the fastener mold 42 is biased against the runner 10. In particular, the fastener mold 42 is based against the runner 10 at the respective through hole 11 thereof. It is worth mentioning that the fastener molds 42 at one longitudinal side of the tabletop 30 are aligned with the fastener molds 42 at another longitudinal side of the tabletop 30. Therefore, the fastener molds 42 at the longitudinal sides of the tabletop 30 are symmetrical.

As shown in FIG. 4, each of the fastener mold 42 has a fastening hole 421 aligned with the through hole 11 of the runner 10 when the runner 10 is placed at the runner cavity 33, such that the fastener 50 is fastened at the fastening hole 421 of the fastener mold 42 through the through hole 11 of the runner 10 to secure the runner 10 along the longitudinal side of the tabletop 10.

The fastening hole 421 of each of the fastener molds 42 has a deformable surface 422 adapted to be deformed for matching with a shape of the fastening end of the fastener 50 when the fastening end thereof is fastened at the fastening hole 421. As it is mentioned above, the fastener mold 42 is formed during the mold injection process of the tabletop 30, such that the fastener mold 42 is made of the plastic as the same of the tabletop 30. The deformable surface 422 of the fastening hole 421 is a tubular flat and smooth surface, wherein a diameter of the fastening hole 421 is slightly smaller than a diameter of the fastening body 52 of the fastener 50. In other words, the diameter of the fastening hole 421 is slightly smaller than a diameter of the through hole 11 of the runner 10.

When the fastening body 52 of the fastener 50 is extended through the through hole 11 of the runner 10 to the fastening hole 421, a substantial pushing force must be exerted to the fastening head 51 of the fastener 50 in order to penetrate the fastening end of the fastener 50 into the fastening hole 421. Therefore, the deformable surface 422 of the fastener mold 42 will be self-deformed to match with the shape of the fastening end of the fastener 50. For example, the screw is used as the fastener 50, the rotatable pushing force must be exerted to the screw head of the screw in order to penetrate the screw end of the screw into the fastening hole 421. The threaded line of the screw will cut at the deformable surface 422 of the fastener mold 42, such that the deformable surface 422 of the fastener mold 42 will be self-deformed to match with the shape of the screw end of the screw, as shown in FIG. 5. Once the deformable surface 422 of the fastener mold 42 is engaged with the fastener 50, the fastener 50 will be secured to lock up the runner 10 along the longitudinal side of the tabletop 10. It is worth mentioning that the fastener molds 42 are integrally extended from the inner side of the surrounding rim 31 only for the fasteners 50 to attached thereto, such that the overall thickness of the surrounding rim 31 with the fastener molds 42 will be increased for the fasteners 50 fastening thereat. The thickness of the surrounding rim 31 will be remained the same. Depending the length of the fastener 50, the fastening end of the fastener 50 can be engaged with the entire length of the fastener mold 42 without penetrating out of the surrounding rim 31, so as to increase the attachment area between the fastener 50 and the fastener mold 42. Having the fastener molds 42 at the inner side of the surrounding rim 31, the injection attachment 41 can withstand 24 to 29 N (Newton force) to ensure the reinforcement of the tabletop 10.

As shown in FIGS. 4 and 5, each of the injection attachments further comprises an upper reinforcing rib 43 and a lower reinforcing rib 44 for reinforcing the strength of the tabletop 30, wherein the upper and lower reinforcing ribs 43, 44 are integrally formed with the tabletop 30 during mold injection process.

The upper reinforcing rib 43 has a top edge integrally extended to the bottom side of the tabletop 30, a bottom edge integrally extended to the fastener mold 42, and a side edge integrally extended to the inner side of the surrounding rim 31.

The lower reinforcing rib 44 has a top edge integrally extended to the fastener mold 42, a bottom edge integrally extended to the bottom rim 32, and a side edge integrally extended to the inner side of the surrounding rim 31.

It is worth mentioning that the upper and lower reinforcing ribs 43, 44 not only reinforce the strength of the tabletop 30 at the longitudinal sides of the tabletop 30 but also support the fastener molds 42 between the bottom side of the tabletop 30 and the bottom rim 32. Therefore, when an external force is exerted at the surrounding rim 31 and/or the bottom rim 32, the upper and lower reinforcing ribs 43, 44 will evenly distribute the external force to the tabletop 30 and the runners 10.

For further enhancing the strength of the tabletop 30, the tabletop 30 further comprises a plurality of table reinforcing ribs 33 and a plurality of corner reinforcing ribs 34. The table reinforcing rib 33 are transversely and integrally extended from the bottom side of the tabletop 30, wherein each of the table reinforcing ribs 33 is integrally extended between two of the upper reinforcing ribs 43 at the longitudinal sides of the tabletop 30 respectively, as shown in FIG. 2.

Figure 6:
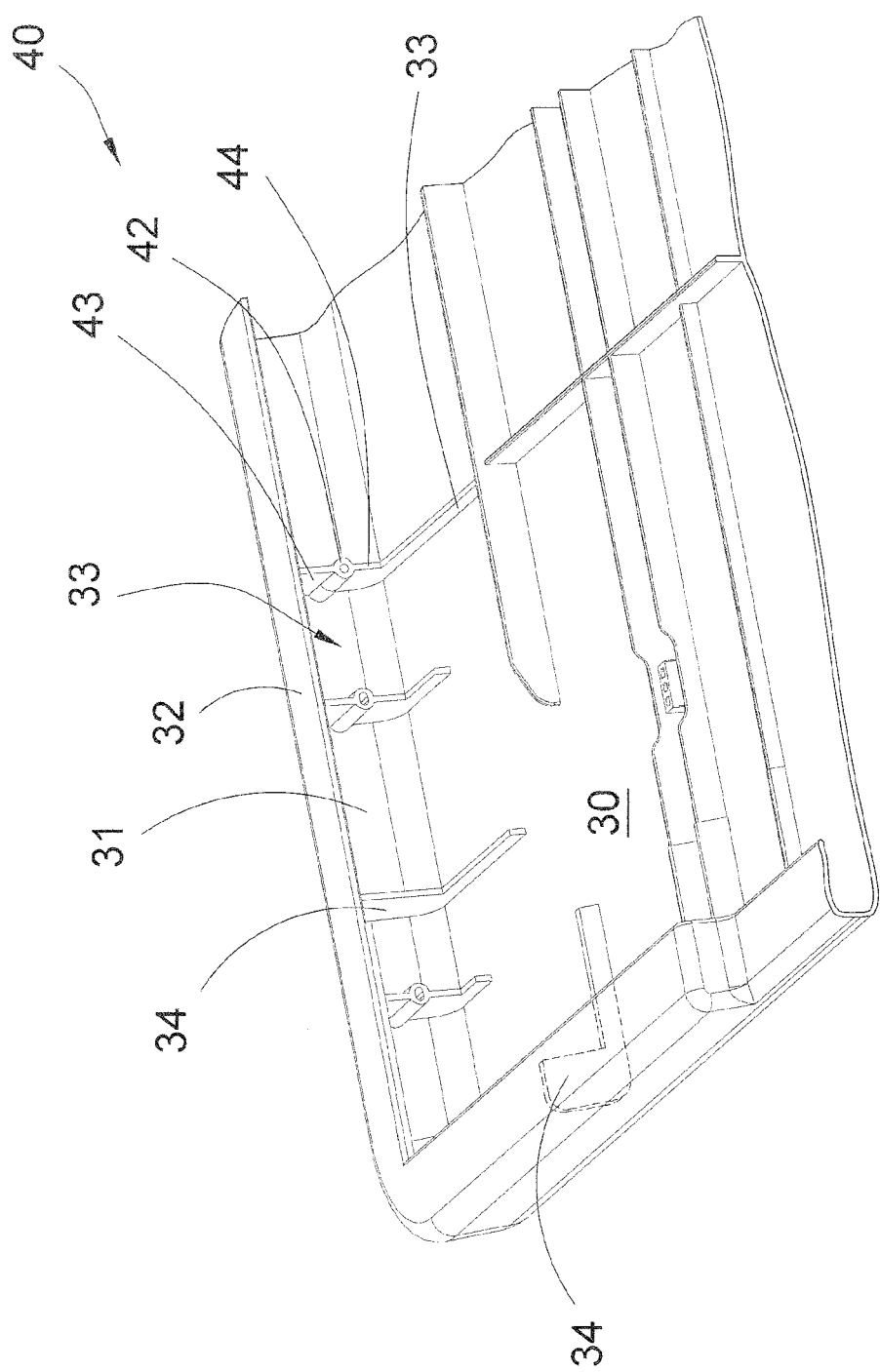
FIG. 6 is a partially perspective view of the injection mold foldable table according to a preferred embodiment of the present invention, illustrating the corner reinforcing ribs.

As shown in FIG. 6, the corner reinforcing ribs 34 are integrally formed at corner portions of the tabletop 30 respectively, wherein each of the corner reinforcing ribs 34 is integrally extended to the bottom side of the tabletop 30 and to the inner side of the surrounding wall 31 to reinforce the strength of the tabletop 30 at the corner portions thereof.

It is worth mentioning that the runner arrangement 40 of the present invention can be formed with the tabletop 30 for incorporating with any supporting frame having the runners 10 that extend the longitudinal sides of the tabletop 30. For example, the runner arrangement 40 can be formed with a one piece structure of the tabletop 30 or can be formed with two foldable tabletop panels as it is mentioned above. Different types of leg frames 20 can be coupled at the bottom side of the tabletop 30 via the runners 10.

It should be appreciated that the runner arrangement 40 of the present invention can also incorporated with a furniture, wherein the runner arrangement 40 is integrally formed with a panel of the furniture. For example, the runner arrangement 40 of the present invention can incorporated with a foldable chair that the runner arrangement 40 is formed with an injection mold seating panel, wherein the runners 10 are extended along the longitudinal sides of the seating panel and are pivotally coupled with the leg frame of the foldable chair.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A foldable table, comprising:
a supporting frame which comprises two runners and two leg frames;
an injection mold table frame, which comprises:
a tabletop comprising a surrounding rim downwardly extended from a peripheral of said tabletop and a bottom rim integrally and inwardly extended from a bottom edge of said surrounding rim to define an elongated runner cavity along said surrounding rim and above said bottom rim, wherein said surrounding rim and said bottom rim form a L-shaped cross section to encircle around said peripheral of said tabletop, wherein said two runners are extended along two longitudinal sides of said tabletop to align with said surrounding rim and to receive along said runner cavity, wherein each of said runners has a plurality of spaced apart through holes, wherein said two leg frames foldably coupled at a bottom side of said tabletop; and
a runner arrangement, which is integrated with said tabletop, comprising a plurality of injection attachments integrally and spacedly extended from an inner side of said surrounding rim and located within said runner cavity, wherein each of said injection attachments comprises a fastener mold integrally and transversely extended from said inner side of said surrounding rim to bias against said respective runner, wherein each of said fastener molds is made of the same material of said tabletop and has a fastening hole aligned with a through hole of said runner, wherein each of said fastening holes has a deformable surface; and
a plurality of fasteners fastening at said injection attachments respectively through each of said runners to securely lock up said runners at said longitudinal sides of said tabletop respectively, wherein each of said fasteners has a fastener head and an elongated fastener body which has a diameter slightly larger than a diameter of said fastening hole, wherein the diameter of said fastening hole is slightly smaller than a diameter of said through hole of said runner, wherein said fastener body of said fastener passes through said through hole of said runner to engage with said fastening hole to ensure said fastener body is engaged with an entire length of said fastener mold so as to increase an attachment area between said fastener and said fastener mold, such that said deformable surface of said fastening hole is deformed to lock up said runner along said runner cavity.

2. The foldable table, as recited in claim 1, wherein each of said injection attachments further comprises an upper reinforcing rib for reinforcing the strength of said tabletop, wherein said upper reinforcing rib has a top edge integrally extended to said bottom side of said tabletop, a bottom edge integrally extended to said fastener mold, and a side edge integrally extended to said inner side of said surrounding rim.

3. The foldable table, as recited in claim 2, wherein each of said injection attachments further comprises a lower reinforcing rib for reinforcing the strength of said tabletop, wherein said lower reinforcing rib has a top edge integrally extended to said fastener mold, a bottom edge integrally extended to said bottom rim, and a side edge integrally extended to said inner side of said surrounding rim.

4. The foldable table, as recited in claim 3, wherein said tabletop further comprises a table reinforcing rib transversely and integrally extended from said bottom side of said tabletop and is integrally extended between two of said upper reinforcing ribs at said longitudinal sides of said tabletop respectively.

5. The foldable table, as recited in claim 4, wherein said tabletop further comprises a plurality of corner reinforcing ribs integrally formed at corner portions of said tabletop respectively, wherein each of said corner reinforcing ribs is integrally extended to said bottom side of said tabletop and to said inner side of said surrounding rim to reinforce the strength of said tabletop at said corner portions thereof.

6. An injection mold table frame for a table which comprises two runners, comprising:
a tabletop, which is an injection mold tabletop, comprising a surrounding rim downwardly extended from a peripheral of said tabletop for aligning said two runners along two longitudinal sides of said tabletop respectively, and a bottom rim integrally and inwardly extended from a bottom edge of said surrounding rim, wherein said surrounding rim and said bottom rim form a L-shaped cross section to encircle around said peripheral of said tabletop, wherein an elongated runner cavity is formed along said surrounding rim and above said bottom rim for receiving said runner therealong; and
a runner arrangement, which is integrated with said tabletop, comprising a plurality of injection attachments integrally and spacedly extended from an inner side of said surrounding rim and located within said runner cavity, wherein each of said infection attachments comprises a fastener mold integrally and transversely extended from said inner side of said surrounding rim for biasing against the respective runner, wherein each of said fastener molds is made of the same material of said tabletop and has a fastening hole for aligning with a through hole of the runner, wherein a diameter of said fastening hole is slightly smaller than a diameter of the through hole of the runner, wherein each of said fastening holes has a deformable surface, wherein said fastener mold is arranged for being engaged with a fastener to securely lock up said runners at said longitudinal sides of said tabletop respectively, wherein an entire length said fastener mold is configured for being engaged with a fastener body of said fastener to increase an attachment area between said fastener and said fastener mold, wherein said deformable surface of said fastening hole is deformed by said fastener body of said fastener for locking up said runner along said runner cavity.

7. The injection mold table frame, as recited in claim 6, wherein each of said injection attachments further comprises an upper reinforcing rib for reinforcing the strength of said tabletop, wherein said upper reinforcing rib has a top edge integrally extended to said bottom side of said tabletop, a bottom edge integrally extended to said fastener mold, and a side edge integrally extended to said inner side of said surrounding rim.

8. The injection mold table frame, as recited in claim 7, wherein each of said injection attachments further comprises a lower reinforcing rib for reinforcing the strength of said tabletop, wherein said lower reinforcing rib has a top edge integrally extended to said fastener mold, a bottom edge integrally extended to said bottom rim, and a side edge integrally extended to said inner side of said surrounding rim.

9. The injection mold table frame, as recited in claim 8, wherein said tabletop further comprises a table reinforcing rib transversely and integrally extended from said bottom side of said tabletop and is integrally extended between two of said upper reinforcing ribs at said longitudinal sides of said tabletop respectively.

10. The injection mold table frame, as recited in claim 9, wherein said tabletop further comprises a plurality of corner reinforcing ribs integrally formed at corner portions of said tabletop respectively, wherein each of said corner reinforcing ribs is integrally extended to said bottom side of said tabletop and to said inner side of said surrounding rim to reinforce the strength of said tabletop at said corner portions thereof.

\* \* \* \* \*